Jan. 8, 1929.    1,698,275
C. PLAAT
METHOD OF AND MEANS FOR TREATING RUBBER FILMS
Filed May 6, 1924    2 Sheets-Sheet 1
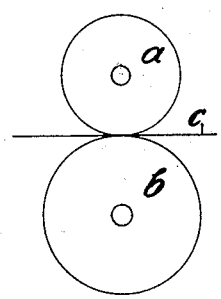
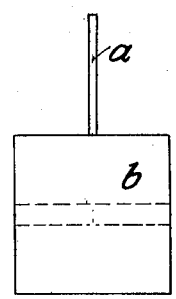
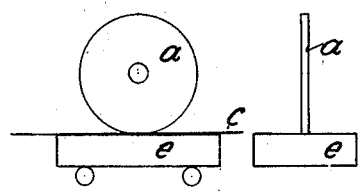
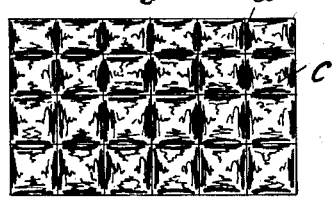
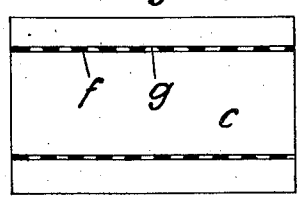
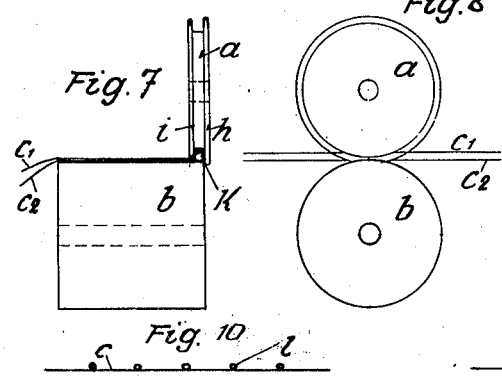
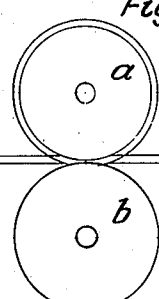
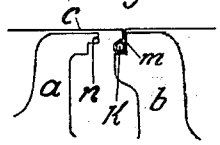
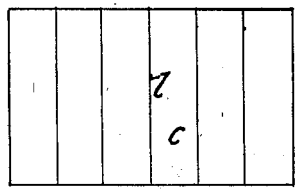
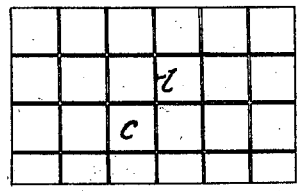
Inventor:
Carl Plaat
By [signature]
Attorney.

Jan. 8, 1929.                                          1,698,275
C. PLAAT
METHOD OF AND MEANS FOR TREATING RUBBER FILMS
Filed May 6, 1924                 2 Sheets-Sheet 2
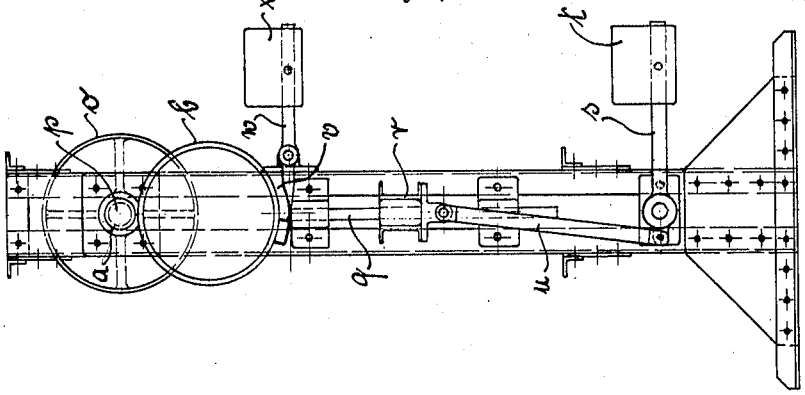
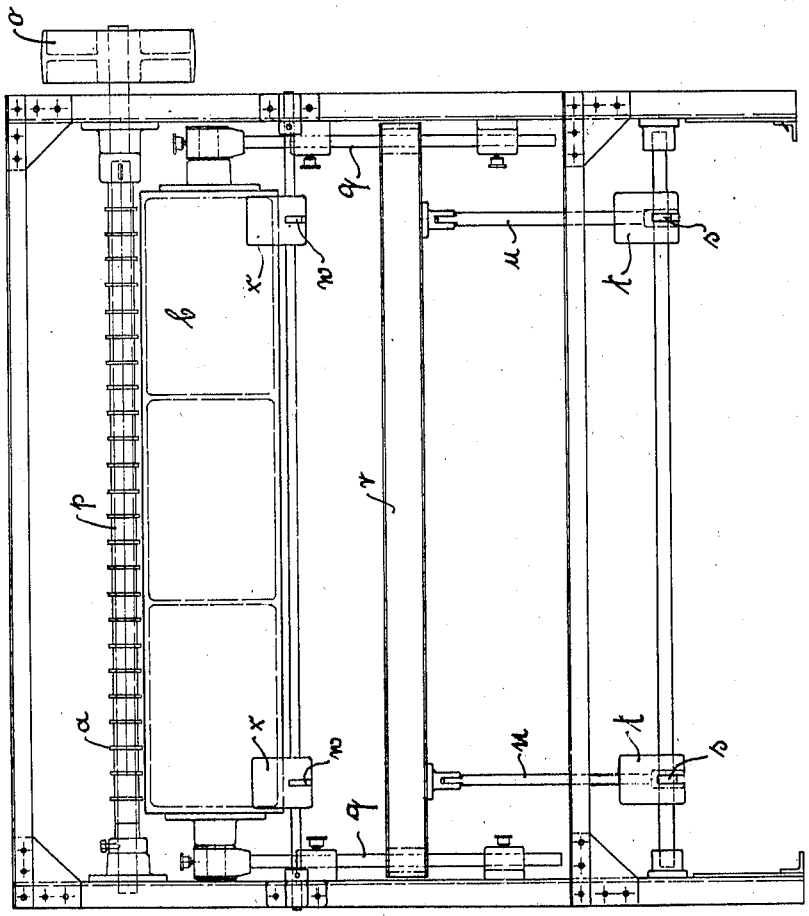
Inventor:
Carl Plaat
by [signature]
Attorney.

Patented Jan. 8, 1929.

1,698,275

UNITED STATES PATENT OFFICE.

CARL PLAAT, OF COLOGNE-NIPPES, GERMANY.

METHOD OF AND MEANS FOR TREATING RUBBER FILMS.

Application filed May 6, 1924, Serial No. 711,384, and in Germany June 11, 1923.

My invention refers to rubber films or plates and more especially to a film or plate presenting ornaments, quills or pleats of various sorts. My invention further comprises the means for making such films or plates and more especially a method of converting a plain rubber film or plate into a quilled and pleated film or plate or for producing on such plain film or plate any desired line systems and ornaments.

In the practice of my invention I cause the plain rubber film or plate to pass through between two surfaces moving at different speeds, for instance between two rolls or between a roll and a slide, one of which moves or rotates at higher speed than the other. If, during the passage of the film or plate, the two surfaces are pressed against one another with slight pressure, the ensuing friction will act towards changing the surface of the rubber film or plate in such manner that a sort of ruling composed of a system of straight or curved lines is produced thereon. According to the manner in which the rubber plate or film is caused to pass between the rows or the like, one of which may be only very narrow, these lines can either be straight or curved.

In the drawings affixed to this specification and forming part thereof a number of rubber films or plates as well as means for making same and which embody my invention are illustrated diagrammatically by way of example. In the drawings:

Fig. 1 is a side elevation and

Fig. 2 a front elevation of a system of rolls adapted for carrying out the new method, Figs. 3 and 4 being similar views of a combination comprising a narrow roll and a plate combined for cooperation in producing the novel product.

Fig. 5 shows a film or plate which can be produced by means of devices such as shown in Figs. 1–4, Fig. 6 shows another kind of film or plate produced in accordance with this invention.

Figs. 7 and 8 are a front elevation and side elevation, respectively, of a modified device, showing the way in which another modification of the novel product is produced.

Fig. 9 is a partial axial section of another device serving the same purpose.

Figs. 10 and 11 are a side view and plan view, respectively, of a product obtainable with the aid of devices, such as shown in Figs. 7–9 and Figs. 12 and 13 are similar views of another modification of the novel product.

Figs. 14 and 15 are a front and side elevation, respectively, of a rolling machine adapted to be used in carrying out my invention.

Referring first to Figs. 1 and 2, $a$ and $b$ are two superposed rolls and $c$ is the rubber film or plate in the course of passing through between the rolls. As shown more particularly in Fig. 2, the width of roll $a$ is only small and far inferior to the width of roll $b$ which serves as a support for the film or plate. The rolls $a$ and $b$ rotate with different velocities, so that friction is created on the surface of the rubber film $c$. As the rolls are pressed against one another with slight pressure, the surface of the film is changed by this friction along the line acted upon by the narrow roll $a$ in such manner that the outward appearance or colouring surface is changed. In consequence of this change a corresponding system of lines or ornaments is produced on the upper surface of the film or plate, the lines being either straight or curved, according as the film is directed in its passage between the rolls.

If higher pressure is exerted on the rolls, the rubber film or plate is further ruffled on both sides of the line acted upon by roll $a$, quill- or pleat-like folds being produced. A rubber plate showing such quills or pleats is illustrated for instance in Fig. 5. The lines $d$ acted upon by the narrow roll $a$ form a substantially rectangular network. In consequence of the ruffling produced on either side of each line each mesh of the net bulges in one direction.

As shown in Figs. 3 and 4, the lowermost roller $b$ can be replaced by a plate or table $e$ moving underneath the narrow upper roller $a$ and with different velocity.

In the manner here described extraodinary effects can be produced. It is for instance possible to act according to this method on rubber articles, such as bathing caps, body cloths, aprons, hats, bonnets, bathing shoes and the like in such manner that their smooth surface is interrupted and subdivided in an artistic manner. In the case where the lines accompanied by the ruffled portions intersect each other in a net-like manner, the mesh-like portions between the lines assume the appearance of wavy projections resembling quilted covers.

By varying the difference of speed of the two surfaces and by selecting a particular difference of speed or by bringing one of the surfaces to a standstill, while causing the other surface to move or rotate with a certain velocity, extraordinary effects can be obtained, more particularly if the narrow roll or roller is kept rotating, while the other surface is at rest.

In this manner a product is for instance obtained such as illustrated in Fig. 6. The film or plate presents lines formed of holes $f$ and ridges $g$ alternating with each other, each line resembling a hemstitch or an open work embroidery. By suitably choosing the form of the lines, a great many different ornaments and patterns can be obtained in this manner. By varying the pressure and velocity of the narrow roller during working, holes can be obtained which vary in width, larger holes alternating with smaller ones, and it is even possible to cause the formation of holes to cease altogether for a certain length of path. On either side of the hemstitch thus obtained the film or plate can further be ruffled, but, as a rule, the formation of holes more or less counteracts the ruffling.

A further product is obtained according to this invention by longitudinally folding the rubber film or plate substantially in parallel with the lines to be acted upon by the rolls or other surfaces and causing each fold to be closed along a seam by the pressure resulting in a joining of the rubber surfaces by vulcanization.

Figs. 7 and 8 more particularly illustrate this method. The narrow roll $a$ rotating above the wider roll $b$ is provided with two flanges $h$ and $i$. The rubber film rests on the lower roll $b$ in two layers $c'$, $c^2$. By the pressure exerted by flange $i$ of the upper roll on the rubber film, the two layers are vulcanized together along the line of contact with the roll and, in consequence thereof, the enclosed pads $l$ (Figs. 10 and 11) are formed on the film along these lines. The rods $k$ can remain within the pads forming a reinforcement thereof, or can be withdrawn therefrom. As shown in Figs. 12 and 13, the pads $l$ may also have a rectangular or other cross section. Simultaneously with this formation of pads the rubber film can also be ruffled on either side thereof and the ruffling may even extend to the pads themselves, these latter being again folded in transverse direction.

By suitably shaping the rolls and more particularly the flanges forming part thereof and by suitably increasing the pressure acting thereon, the tubular pads thus obtained can even be separated off from the film.

A device serving this purpose is shown for instance in Fig. 9 where $a$ and $b$ are two disc-shaped bodies rotating at different speeds. Disc $b$ is formed with an annular groove $m$, while disc $a$ has a projecting flange $n$ extending into said groove. The rubber film $c$ is placed around the mandrel $k$ as shown in the drawing and inserted in the groove $m$. The sharp edges of the projecting flange $n$ will then sever the tube or hose from the film $c$. The mandrel $k$ can subsequently be withdrawn from this tube or hose and, by employing a mandrel of other than circular cross section, a tube or hose of corresponding section can be obtained.

In the machine illustrated in Figs. 14 and 15, $o$ is the pulley mounted on the driving shaft $p$ carrying the narrow rolls or annular flanges $a$, while $b$ is the large roll. The bearings supporting this latter roll are carried by vertically guided rods $q$ connected with each other by a cross beam $r$. On this cross beam weights $t$ mounted on levers $s$ act by means of links $u$ in such manner that roll $b$ is forced upwards. The rubber skin or plate to be acted upon is caused to pass through between the large roll $b$ and the narrow rolls or flanges $a$. The roll $b$ is imparted a different speed from rolls $a$ by means of brakes $v$ applying themselves to the circumference of roll $b$, weights $x$ adjustably mounted on the brake levers $e$ exerting pressure on the brake blocks $v$. By displacing the weights $x$ on the levers $w$ the braking effect can be regulated so as to vary the circumferential speed of roll $b$. The braking weights $x$ at the same time serve for regulating and reinforcing the working pressure which can be further regulated by rotatably adjusting the weights $t$ on levers $s$.

I wish it to be understood that I do not desire to be limited to the exact details of construction shown and described, for obvious modifications will occur to a person skilled in the art.

I claim:—

1. The method of treating a rubber film comprising subjecting said film to the frictional action of a narrow rotary surface.

2. The method of treating a rubber film comprising causing two pressure surfaces moving at different velocities to act from opposite sides on the folded film.

3. The method of treating a rubber film comprising causing the doubled-up film to pass through between two surfaces, one of which rotates relatively to the other.

4. The method of making a rubber tube comprising doubling a rubber film and causing two narrow rotary surfaces to act on said film from opposite sides.

5. The method of treating a rubber film comprising causing frictional pressure to act on a narrow portion of such film.

6. Rubber film treating means comprising two superposed rolls of materially different length, means for creating regulatable pressure between said rolls and means for causing said rolls to rotate with different velocities.

In testimony whereof I affix my signature.

CARL PLAAT.